United States Patent Office 2,870,874
Patented Jan. 27, 1959

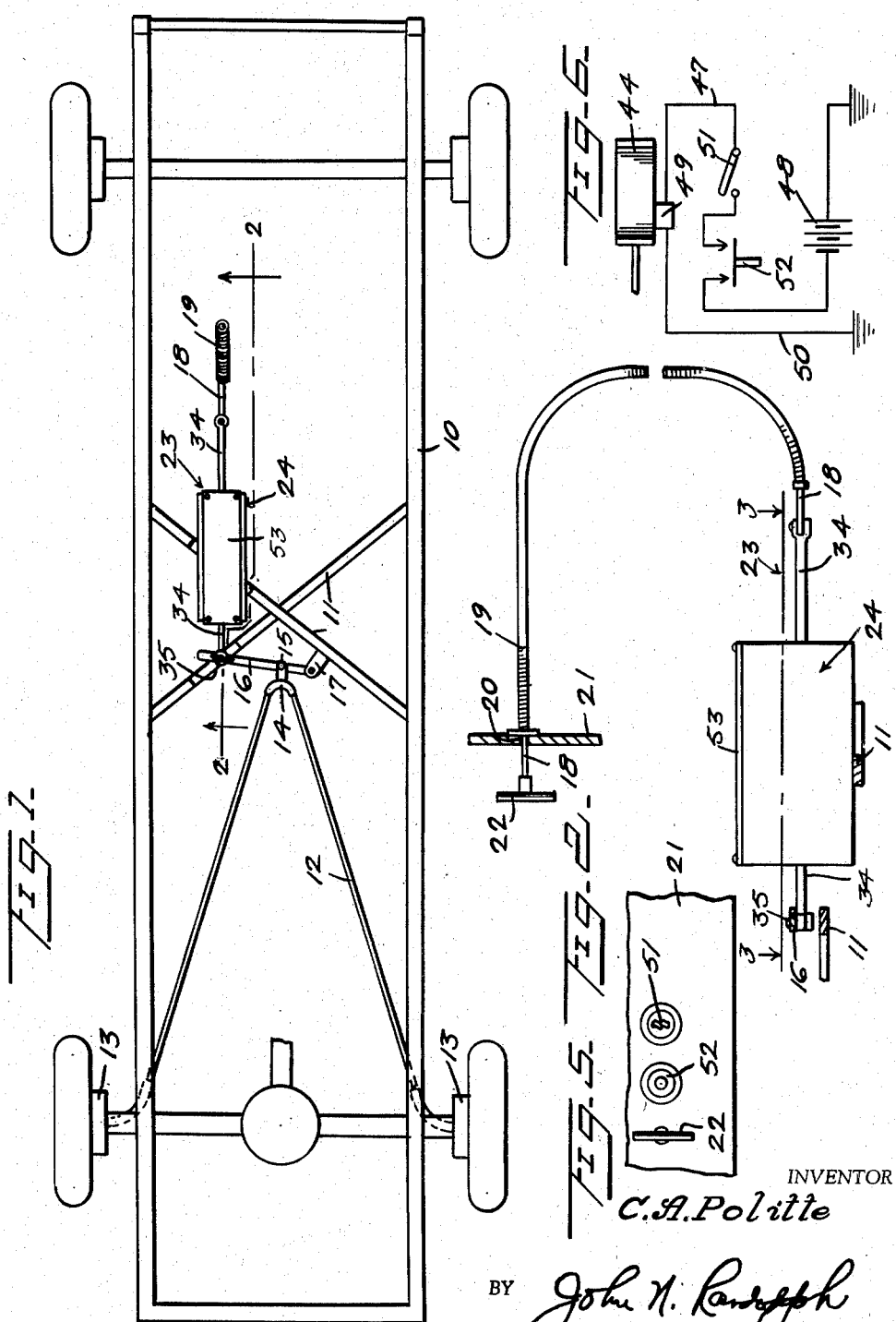

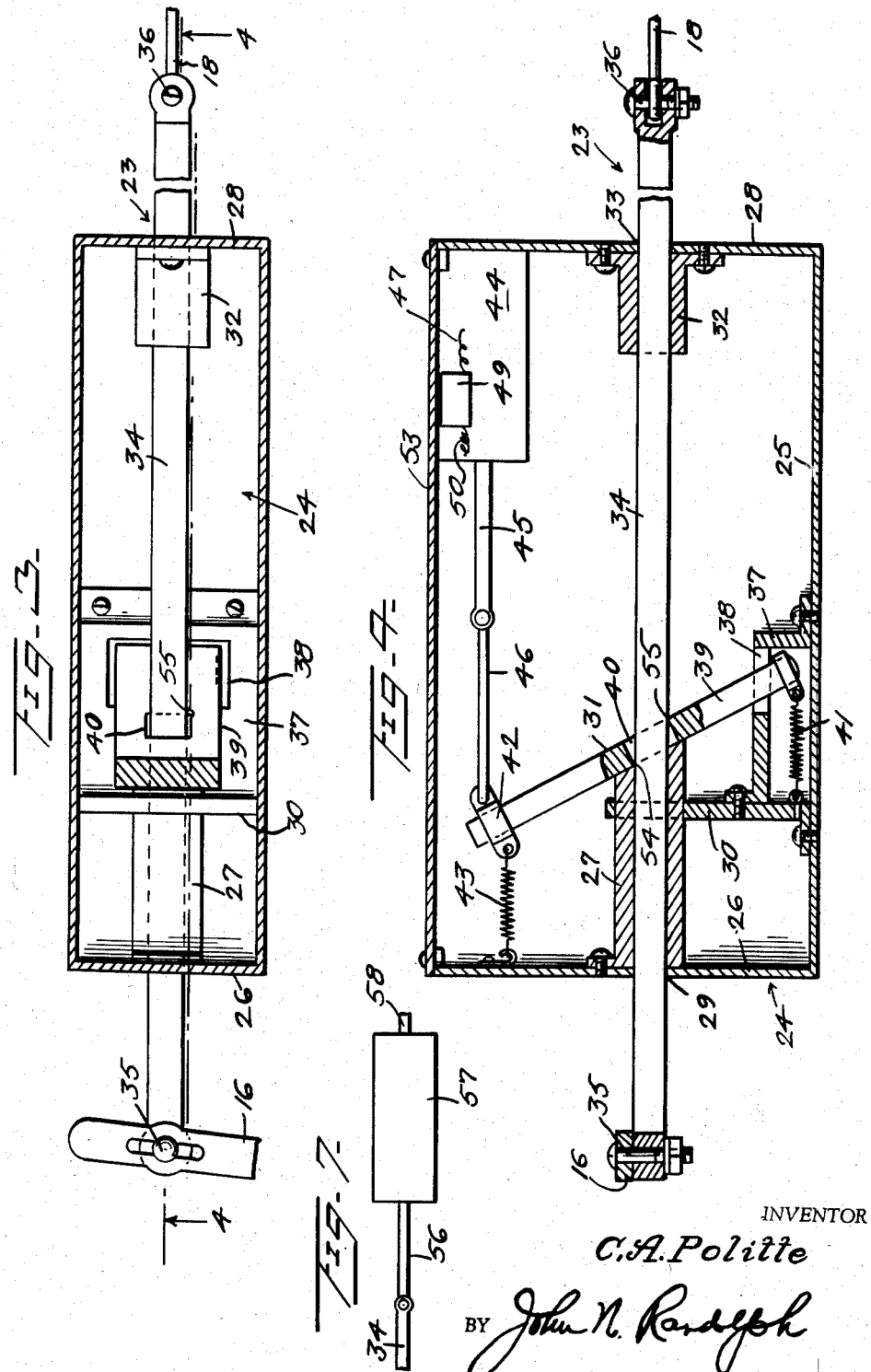

2,870,874

EMERGENCY BRAKE SAFETY LOCK

Cecil A. Politte, St. Louis, Mo.

Application January 28, 1957, Serial No. 636,785

5 Claims. (Cl. 188—67)

This invention relates to a motor vehicle safety attachment and more particularly to a device for automatically locking the emergency brake or parking brake of a motor vehicle in an applied position so that the brakes cannot be released until the ignition circuit is in a closed position.

Accordingly, it is an object of the invention to provide a safety attachment which will effectively prevent release of the emergency or parking brake by an unauthorized person such as a child and which will also make it more difficult for a motor vehicle equipped with the safety attachment to be stolen since the ignition switch must be moved to a closed position before the attachment can be actuated to permit release of the emergency brake.

Still a further object of the invention is to provide such an attachment of extremely simple construction which may be readily mounted on motor vehicles and which can be utilized with substantially any type of parking or emergency brake employing mechanical elements in the linkage system thereof.

Various other objects and advantages of the invention will hereinafter become more fully apparent from the following description of the drawings, illustrating a presently preferred embodiment thereof, and wherein:

Figure 1 is a plan view of a portion of the chassis of a motor vehicle and showing the brake locking attachment associated with the mechanical linkage system of the emergency or parking brakes;

Figure 2 is an enlarged side elevational view taken substantially along the line 2—2 of Figure 1;

Figure 3 is an enlarged fragmentary horizontal sectional view, taken substantially along a plane as indicated by the line 3—3 of Figure 2;

Figure 4 is a vertical sectional view, taken substantially along a plane as indicated by the line 4—4 of Figure 3;

Figure 5 is a fragmentary plan view of a part of the vehicle instrument panel;

Figure 6 is a diagrammatic view illustrating the electric circuit of the brake locking attachment, and Figure 7 is a fragmentary plan view illustrating a part of the attachment utilized with another type of emergency brake actuating means.

Referring more specifically to Figures 1 to 6 of the drawings, a motor vehicle chassis is shown in Figure 1 and is designated generally 10 and is provided with cross bracing 11. A cable 12 is shown having its ends leading from the rear wheel brakes 13. The forwardmost intermediate portion of the cable 12 extends slidably through a yoke 14 which is pivotally connected at 15 to a lever 16. The lever 16 is pivotally mounted at one end thereof on a bracket 17, which extends from a part of the bracing 11, for forward and rearward swinging movement of the lever 16. When the lever 16 is swung forwardly or clockwise as seen in Figure 1, a pull is exerted on the cable ends for applying the rear wheel brakes 13 as emergency or parking brakes, in a conventional manner. The lever 16 may be actuated in any suitable manner, as by means of a wire 18 which extends slidably through a flexible tubular casing 19 and which has one end projecting from an end of the casing 19 and extending loosely through an opening 20 of the vehicle instrument panel 21 and to the terminal of which end a knob or handle 22 is secured. The other end of the wire 18, which projects from the other end of the tubular casing 19, is normally connected to the lever 16 at a point remote from its pivoted end. The parts previously described constitute a conventional hand brake actuating linkage and are disclosed merely to illustrate a preferred application and use of the safety brake locking attachment, designated generally 23 and comprising the invention.

The brake locking attachment 23 includes an elongated box-like housing 24, the bottom 25 of which is supported on and suitably secured to a part of the bracing 11, as seen in Figures 1 and 2, and so that the housing 24 is disposed longitudinally of the vehicle chassis 10. A rear wall 26 of the housing 24, which is disposed forwardly of and adjacent a free end portion of the lever 16, has a guide sleeve 27 secured to the inner side thereof and extending therefrom part way of the housing toward its front wall 28. The rear wall 26 has an opening 29 registering with the bore of the guide sleeve 27. A plate 30 is fixed to and extends upwardly from a part of the bottom 25 and has an upper portion secured to and forming a support for an inner part of the guide sleeve 27 and which is spaced from the inclined or beveled inner end 31 of said guide sleeve. Said inner end 31 is inclined upwardly and rearwardly relative to the housing 24, as best illustrated in Figure 4. A guide sleeve 32 is secured to and extends inwardly from the front wall 28 and the bore thereof registers with an opening 33 of the wall 28. A rod 34 extends slidably through the guide sleeves 27 and 32 and the openings 29 and 33. A rear end of the rod 34 is connected as seen at 35 in Figures 3 and 4 to the free end portion of the lever 16 for pivotal and sliding movement of said rod end relative to the lever. The forward end of the rod 34, which extends forwardly from the front wall 28, is connected to the other end of the wire 18 as seen at 36.

A box-like structure 37 is disposed within the housing 24 and is secured to the plate 30 and bottom 25 and extends from the part 30 toward the front end wall 28. The top of the box 37 is provided with a relatively large slot 38. A bar 39 is provided in an intermediate portion thereof with an opening 40 through which the pull rod 34 extends and by which the bar 39 is supported with its lower end extending into the box structure 37 loosely through the opening 38. A pull spring 41 is disposed in the box structure 37 and has one end connected to the lower end of the bar 39 and an opposite end anchored to the plate 30 for urging the lower end of the bar toward said plate. A connector member 42 is secured to the upper portion of the bar 39, substantially above the level of the guide sleeve 27. A pull spring 43 has one end secured to the connector member 42 and its opposite end anchored to the rear wall 26 for urging the upper end of the bar 39 rearwardly of the housing 24, in the same direction that the lower end of the bar 39 is pulled by the spring 41. However, the spring 43 is stronger than the spring 41.

An electromagnet 44 is secured to the upper portion of the forward end of the housing 24. A core 45 of the electromagnet extends rearwardly toward the upper end of the bar 39. A link 46 has a forward end pivotally connected to the rear end of the core 45 and a rear end pivotally connected to the connector member 42, as seen in Figure 4.

Figure 6 illustrates the electric circuit of the electromagnet 44 which includes a conductor wire 47 which leads from the positive side of a current source, such as a vehicle storage battery 48, and which is connected to the winding of the electromagnet 44 through a relay 49. A ground conductor 50 leads from the relay 49. A vehicle ignition switch 51 and a pushbutton switch 52 are each mounted in the electric circuit of the electromagnet 44, the pushbutton switch 52 constituting a normally open switch. As seen in Figure 5, the switch 52 is preferably mounted on the instrument panel 21 adjacent the ignition switch 51 and the hand brake handle 22 but may be mounted in any other location accessible to the vehicle operator. The housing 24 is provided with a removable top wall or cover 53 to afford access to the interior thereof.

The springs 43 and 41 normally hold the bar 39 with its intermediate portion disposed flush against the beveled end 31 of the guide 27 so that the top and bottom diametrically opposed edges 54 and 55, respectively, will bite into portions of the top and bottom of the pull rod 34. Thus, after the pull rod 34 has been displaced forwardly through the housing 24 by a pull on the handle 22 for applying the emergency or parking brake, as illustrated in the drawings, said rod 34 will be held against rearward sliding movement by the biting engagement of the edges 54 and 55 therewith, so that the emergency or parking brake will not be released by pushing the handle 22 forwardly toward the instrument panel 21. When it is desired to release the emergency brake, the ignition switch 51 must be moved to an "on" position and the pushbutton switch 52 must be closed. When this occurs, the electromagnet 44 will be energized to pull the core 45 forward or from left to right of Figure 4 to swing the upper end of the bar 39 to the right to cause said bar to assume a more nearly upright position and so that the pull rod 34 will be released from engagement with the edges 54 and 55. While the bar 39 is thus held by the energized electromagnet 44, the parking brake linkage can be moved to release the parking brake. It will thus be seen that the brake locking attachment 23 will prevent release of the parking brake until the ignition switch 51 is moved to a circuit closing position and until the switch 52 is also moved to a circuit closing position.

As soon as pressure on the switch 52 is released, said switch will automatically return to an open position so that the electromagnet 44 will be de-energized allowing the springs 43 and 41 to return the latching bar 39 to its position of Figures 3 and 4. Thereafter, when the handle 22 is pulled rearwardly to apply the parking brake, the pull rod 34 in moving forwardly or from left to right of Figures 3 and 4 will move the latch bar 39 out of engagement with the inclined surface 31. When this occurs and due to the fact that the edge 54 has a tighter engagement with the rod 34 while said rod is moved from left to right, the latch bar 39 will rock slightly toward an upright position so that the pull rod 34 can slide forwardly therethrough. When forward movement of the rod 34 has ceased, the springs 43 and 41 will return the latch bar 39 to its position of Figures 3 and 4 automatically relocking the emergency brake in an applied position and so that the electromagnet 44 must again be energized before the emergency brake can be released.

Figure 7 illustrates that the emergency brake locking attachment 23 may be utilized with other types of emergency brake actuating means. In this view the forward end only of the pull rod 34 is shown and said end is connected to a rear end of a wire or rod 56 leading from suitable means, not shown, contained within a vacuum cylinder 57 which has a suction line 58 connected to the forward end thereof and which may lead from the intake manifold, not shown, of the engine. Suitable means may be provided for supplying suction to the cylinder 57 through the line 58 for pulling the rod 56 inwardly of the rear end of the cylinder to exert a forward pull from left to right on the pull rod 34, and suitable means may be provided for releasing the suction in the cylinder 57 to allow the pull rod 34 to move from right to left or rearwardly for releasing the emergency brake when the latch bar 39 is released by the electromagnet 44 being energized.

Various other modifications and changes are contemplated and may be resorted to, without departing from the function or scope of the invention as hereinafter defined by the appended claims.

I claim as my invention:

1. In combination with a vehicle emergency brake actuating linkage, a brake locking attachment including a pull rod interposed in the brake actuating linkage, a guide member in which said pull rod is reciprocably supported, a latch bar having an opening through which the pull rod loosely extends, spring means urging the latch bar to a canted position for frictional gripping engagement with the pull rod, said guide member having a beveled end forming abutment means against which a part of the latch bar bears when held in a canted position by said spring means to prevent sliding movement of said pull rod in one direction for locking said brake actuating means against movement toward a brake releasing position, an electromagnet means connected to said latch bar for rocking the latch bar against the action of said spring means toward a position normal to the axis of the pull rod for disengaging the latch bar from frictional gripping engagement with the pull rod to permit movement of the brake actuating mechanism toward a brake releasing position.

2. A brake locking attachment as in claim 1, said latch bar opening being spaced from the ends of the latch bar, said spring means comprising pull springs connected to the ends of the latch bar and urging the latch bar ends in the same direction, one of said pull springs being stronger than the other pull spring for rocking the latch bar to its canted position against the abutment means.

3. A brake locking attachment as in claim 2, said electromagnetic means being connected to the end of the latch bar engaged by the stronger pull spring.

4. A brake locking attachment as in claim 3, and means loosely confining the end of the latch bar engaged by the weaker spring for limiting movement of said latch bar end and to facilitate movement of the latch bar toward a position normal to the axis of the pull rod when the electromagnetic means is energized.

5. An emergency brake locking attachment as in claim 1, a second guide member, spaced from the first mentioned guide member, in which said pull rod is reciprocably supported, said latch bar being mounted on the pull rod between said guide members, a housing supporting said guide members and containing said latch bar, spring means and electromagnetic means and through which said pull rod slidably extends.

References Cited in the file of this patent

UNITED STATES PATENTS

| | | |
|---|---|---|
| 836,303 | Christensen | Nov. 20, 1906 |
| 1,650,963 | Schauman | Nov. 29, 1927 |
| 1,804,773 | Hubbell | May 12, 1931 |
| 1,843,966 | Adams | Feb. 9, 1932 |
| 1,853,517 | Finnerty | Apr. 12, 1932 |
| 2,062,371 | Musser | Dec. 1, 1936 |
| 2,539,538 | Hayes | Jan. 30, 1951 |
| 2,763,349 | Pokorny | Sept. 18, 1956 |
| 2,789,667 | Tannenbaum et al. | Apr. 23, 1957 |